(12) United States Patent
Wolverton et al.

(10) Patent No.: US 10,400,833 B1
(45) Date of Patent: Sep. 3, 2019

(54) CLUTCH PISTON ASSEMBLY FOR INCREASING CLAMPING FORCE

(71) Applicants: Ronald Wayne Wolverton, Mary Esther, FL (US); Christopher Bradly Posadas, Mary Esther, FL (US)

(72) Inventors: Ronald Wayne Wolverton, Mary Esther, FL (US); Christopher Bradly Posadas, Mary Esther, FL (US)

( * ) Notice: Subject to any disclaimer, the term of this patent is extended or adjusted under 35 U.S.C. 154(b) by 135 days.

(21) Appl. No.: 15/833,887

(22) Filed: Dec. 6, 2017

(51) Int. Cl.
*F16D 25/12* (2006.01)
*F16D 25/06* (2006.01)
*F16H 45/02* (2006.01)

(52) U.S. Cl.
CPC ............. *F16D 25/12* (2013.01); *F16D 25/06* (2013.01); *F16H 45/02* (2013.01)

(58) Field of Classification Search
CPC ...... F16D 25/12; F16D 25/0638; F16D 25/14; F16D 25/126; F16D 25/123; F16D 2300/08; F16D 13/644
See application file for complete search history.

(56) References Cited

U.S. PATENT DOCUMENTS

| | | | | |
|---|---|---|---|---|
| 5,662,198 A | * | 9/1997 | Kojima | F16D 25/0638 192/106 F |
| 2004/0094383 A1 | * | 5/2004 | Kinoshita | F16D 25/0638 192/85.41 |
| 2006/0169567 A1 | * | 8/2006 | Ichikawa | F16D 25/0638 192/85.34 |

* cited by examiner

*Primary Examiner* — Jacob S. Scott
*Assistant Examiner* — Lillian T Nguyen
(74) *Attorney, Agent, or Firm* — Peter Loffler

(57) ABSTRACT

A clutch piston assembly increases the clamping pressure within a transmission or torque converter, without increasing the oil pressure, in order to reduce the slippage of the clutches against the reaction plates and has a piston housing that receives a cylinder bore ring atop of which is seated a cylinder bore. The cylinder bore has a series of progressively wider inner grooves with the uppermost groove being the widest yet substantially narrower than either of the cylinder bore ring's grooves, thereby decreasing the overall apply area of the central bore thereby increasing the clamping pressure that can be exerted by the clutch piston assembly.

6 Claims, 6 Drawing Sheets

CLUTCH PISTON ASSEMBLY FOR INCREASING CLAMPING FORCE

BACKGROUND OF THE INVENTION

1. Field of the Invention

The present invention relates to a clutch piston assembly within a transmission or torque converter that uses a separate piston cylinder bore and a replacement clutch piston that applies against reactions surfaces within the torque converter or transmission in order to increase clamping force on the clutches in order to reduce clutch slippage against their reaction plates without increasing the oil pressure within the system.

2. Background of the Prior Art

Racing vehicles operate at very high RPMs (Revolutions Per Minute). As the RPMs increase, the clutches tend to slip against their reaction plates or steels which results in loss of power transfer from the engine to the drive wheels. As even the small percentage power loss can be the difference between winning and losing a race, such a situation is highly undesirable. To address this problem, many designers increase the hydraulic pressure within the transmission or torque converter so as to increase the clamping force of the clutch piston onto the clutches and reaction plates in order to increase the clamping pressure of the clutches against their reaction plates thereby preventing or at least reducing slippage and the attendant loss of power. While often effective, this technique increases the oil pressure within the transmission and torque converter, thereby increasing the oil's temperature and thus the internal operating temperature within the transmission and torque converter. This increase in temperature results in premature oil break down, premature operating parts wear, and eventually system failure.

Another solution is to change the type of friction material used on the clutches and reaction plates but this can be either costly or simply may not be possible due to licensing and exclusivity agreements.

What is needed is a system that increases the clamping force of the clutch piston onto the clutches and reaction plates in order to prevent slippage of the clutches against the reaction plates while maintaining the oil pressure (and thus oil temperature) within the system at reasonably low levels. Ideally, such a system is of a relatively simple design and construction and can be installed with ease without the need to otherwise substantially modify the torque converter or transmission.

SUMMARY OF THE INVENTION

The clutch piston assembly for increasing clamping force of the present invention addresses the aforementioned needs in the art by providing a relatively simple and straightforward system that enlarges the cylinder bore within the piston housing, also referred to as a clutch basket, in order to increase the clamping force that can be applied by the clutch piston without increasing the hydraulic oil pressure. The clutch piston assembly for increasing clamping force is able to withstand the harsh heat environment within which it operates. The clutch piston assembly for increasing clamping force is of relatively simple design and construction, being produced using standard manufacturing techniques that employ off the shelf parts, so as to be cost-effective to produce, thereby being economically attractive to potential consumers of this type of vehicle system. The clutch piston assembly for increasing clamping force does not require substantial torque converter or transmission modification.

The clutch piston assembly for increasing clamping force of the present invention is comprised of a piston housing that has an interior wall surface and an exterior wall surface. The piston housing also has a base that transitions at a first end into an upwardly directed step, which transitions into a diagonally upwardly and outwardly shoulder, which transitions into an upwardly directed side wall and an opposing end of the base transitions into a centrally disposed bore. The upwardly directed step has a first inside diameter. A first O-ring is disposed within the piston housing and is seated on the shoulder proximate the shoulder's transition from the upwardly directed step. A cylinder bore ring is disposed within the piston housing atop the first O-ring and the shoulder and abuts the interior wall surface of the side wall. The cylinder bore ring has an inner groove that has a second inside diameter which is greater than the first inside diameter and also has an outer groove that has a third inside diameter that is greater than the second inside diameter. A cylinder bore is disposed within the piston hosing and is seated on the cylindrical bore ring and on the base. The cylinder bore has an outer periphery that abuts the interior wall surface at the side wall at the upwardly directed step. The cylinder bore also abuts an outer wall surface of the central housing bore. The cylinder bore has a series of progressively wider inner grooves, with the upmost groove (furthest from the base) being the widest, this groove having a fourth inside diameter that is smaller relative to the third inside diameter and being the outer limit of the cylinder bore apply area. A second O-ring is disposed between the cylinder bore ring and the cylinder bore. A series of screws pass through the piston housing and into the cylinder bore ring. Other means of attaching the cylinder bore into the piston housing such as welding and press-fitting may also be used. The cylinder bore has an interior annular groove that receives a third O-ring which abuts the outer wall surface of the central housing bore.

DESCRIPTION OF THE PREFERRED EMBODIMENT

Figure 1:
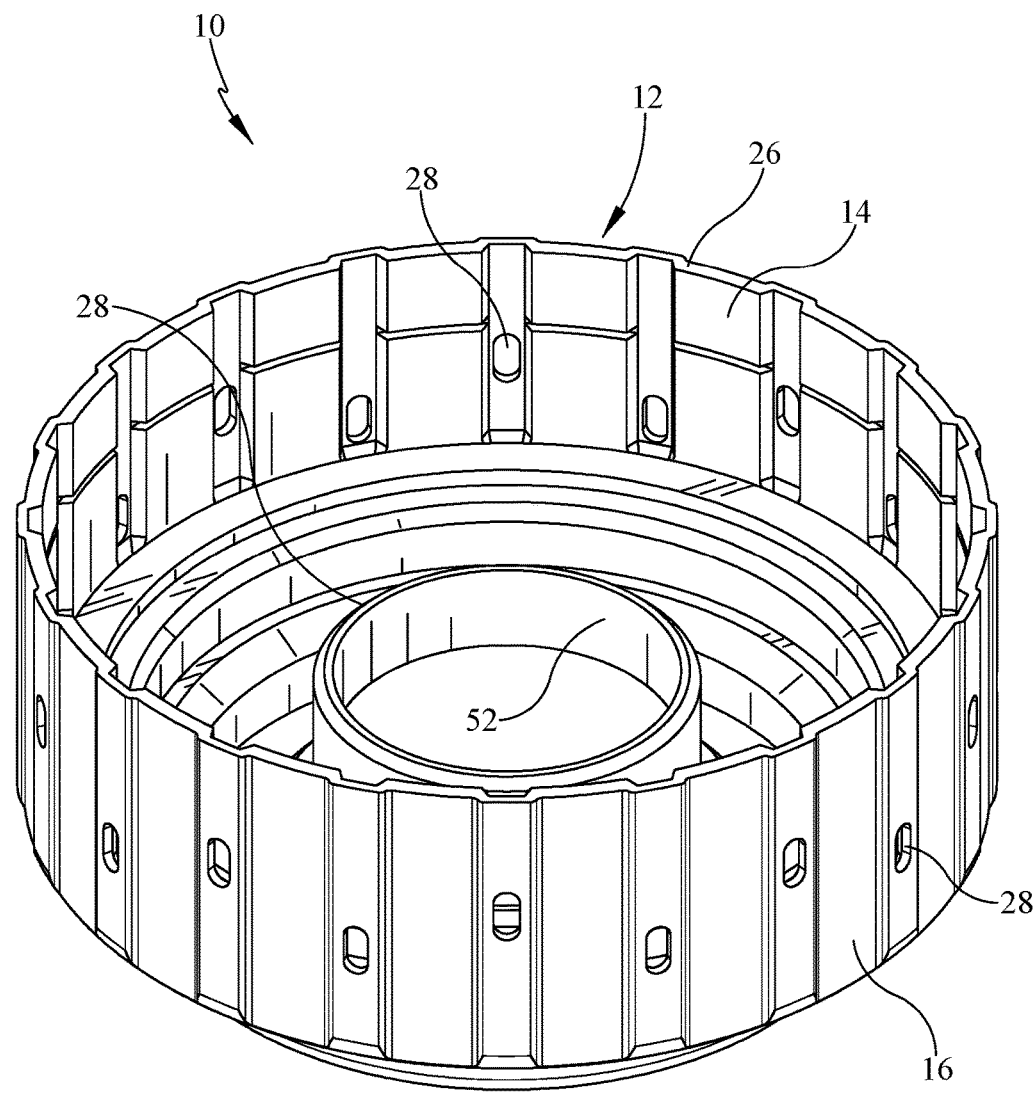
FIG. 1 is an upper perspective view of the clutch piston assembly for increasing clamping force of the present invention.
Figure 2:
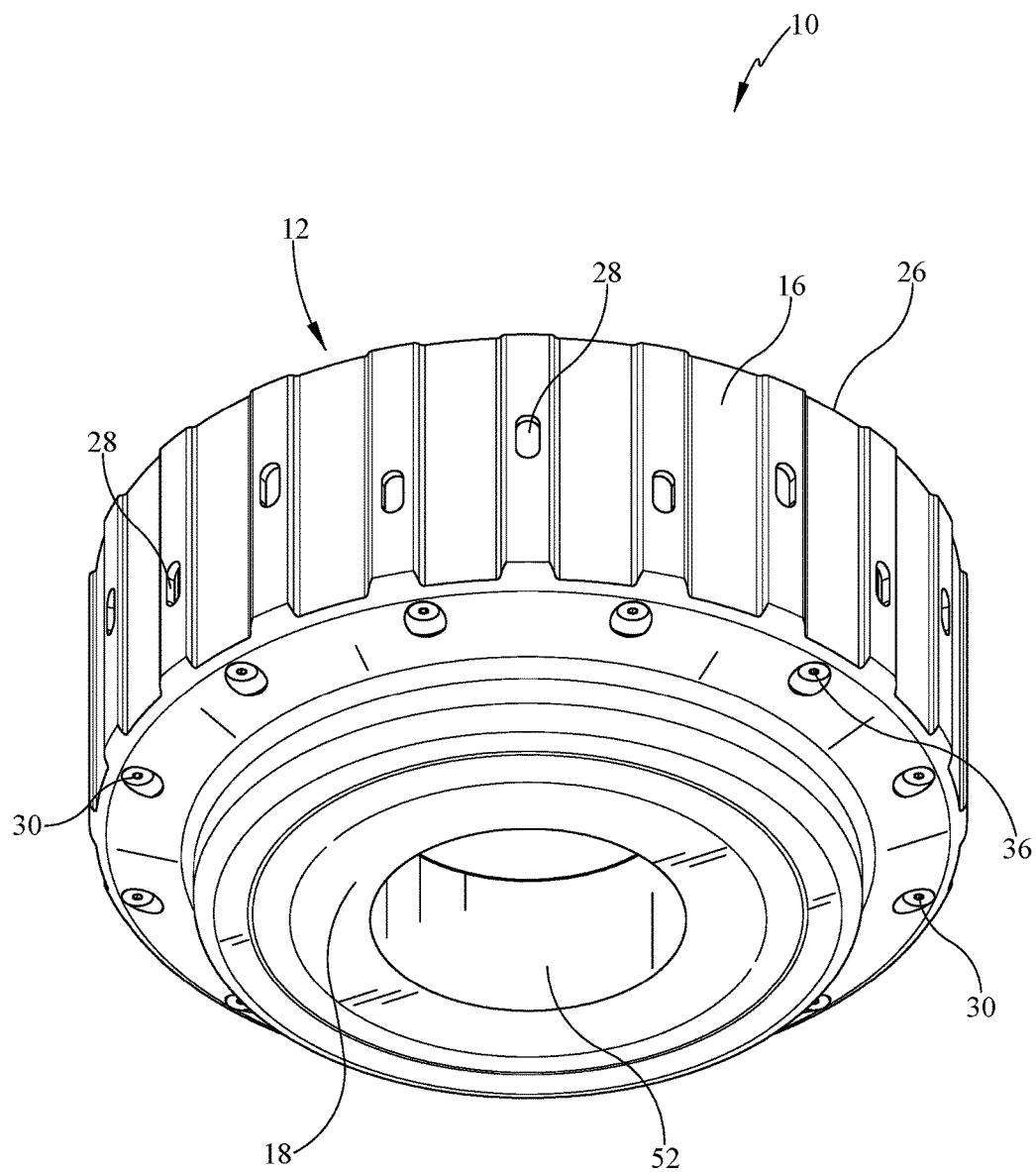
FIG. 2 is a lower perspective view of the clutch piston assembly for increasing clamping force.
Figure 3:
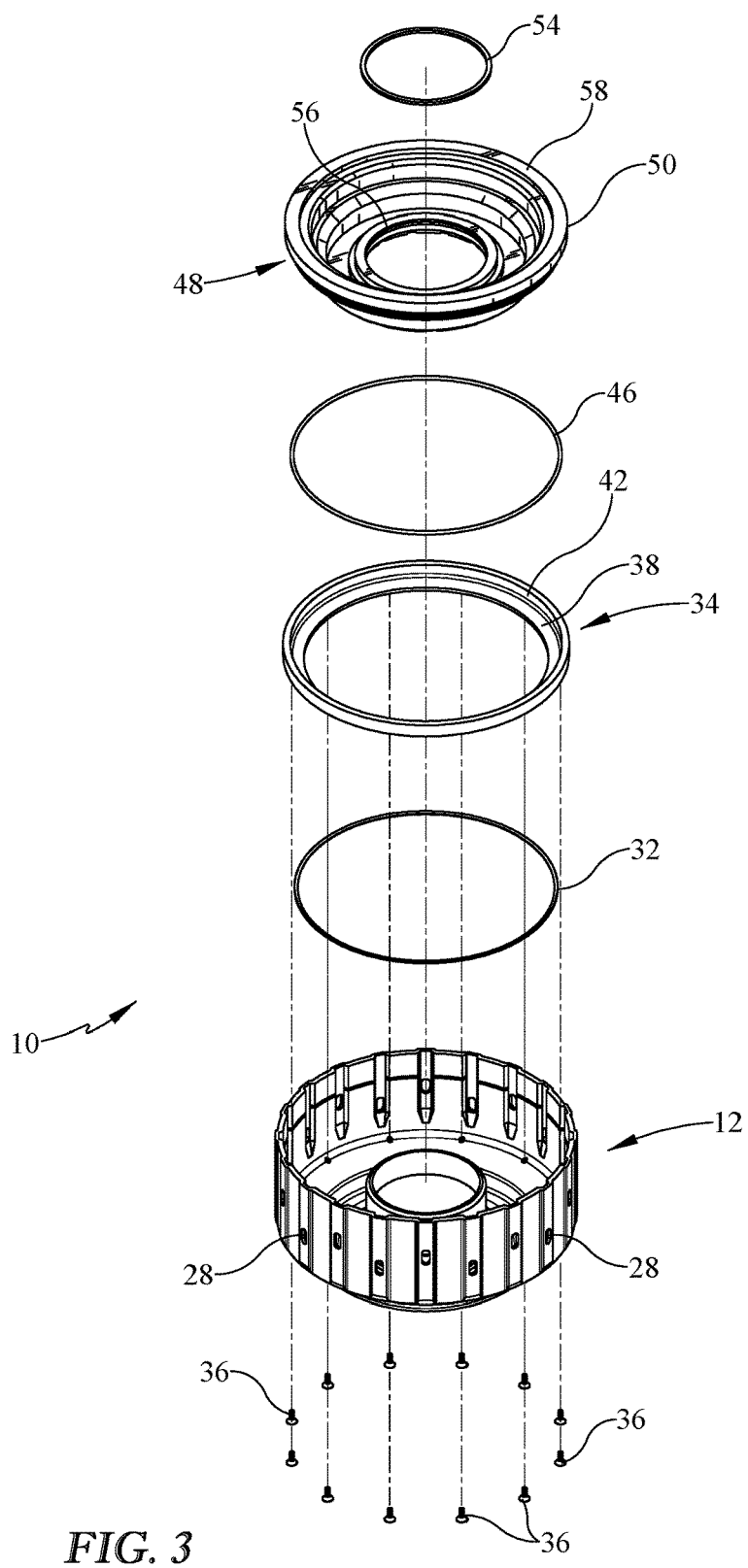
FIG. 3 is n exploded view of the clutch piston assembly for increasing clamping force.
Figure 4:
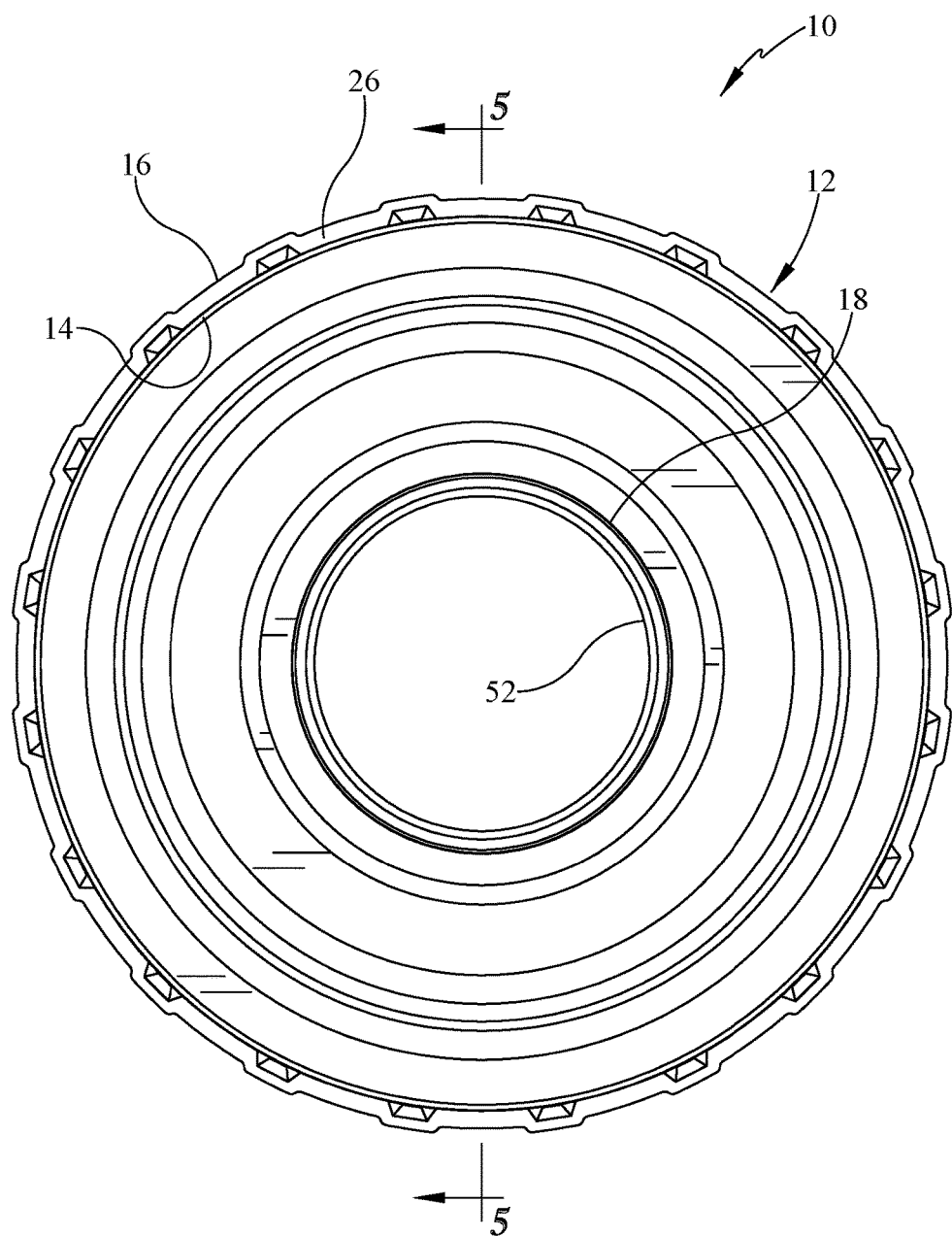
FIG. 4 is a top view of the clutch piston assembly for increasing clamping force.
Figure 5:
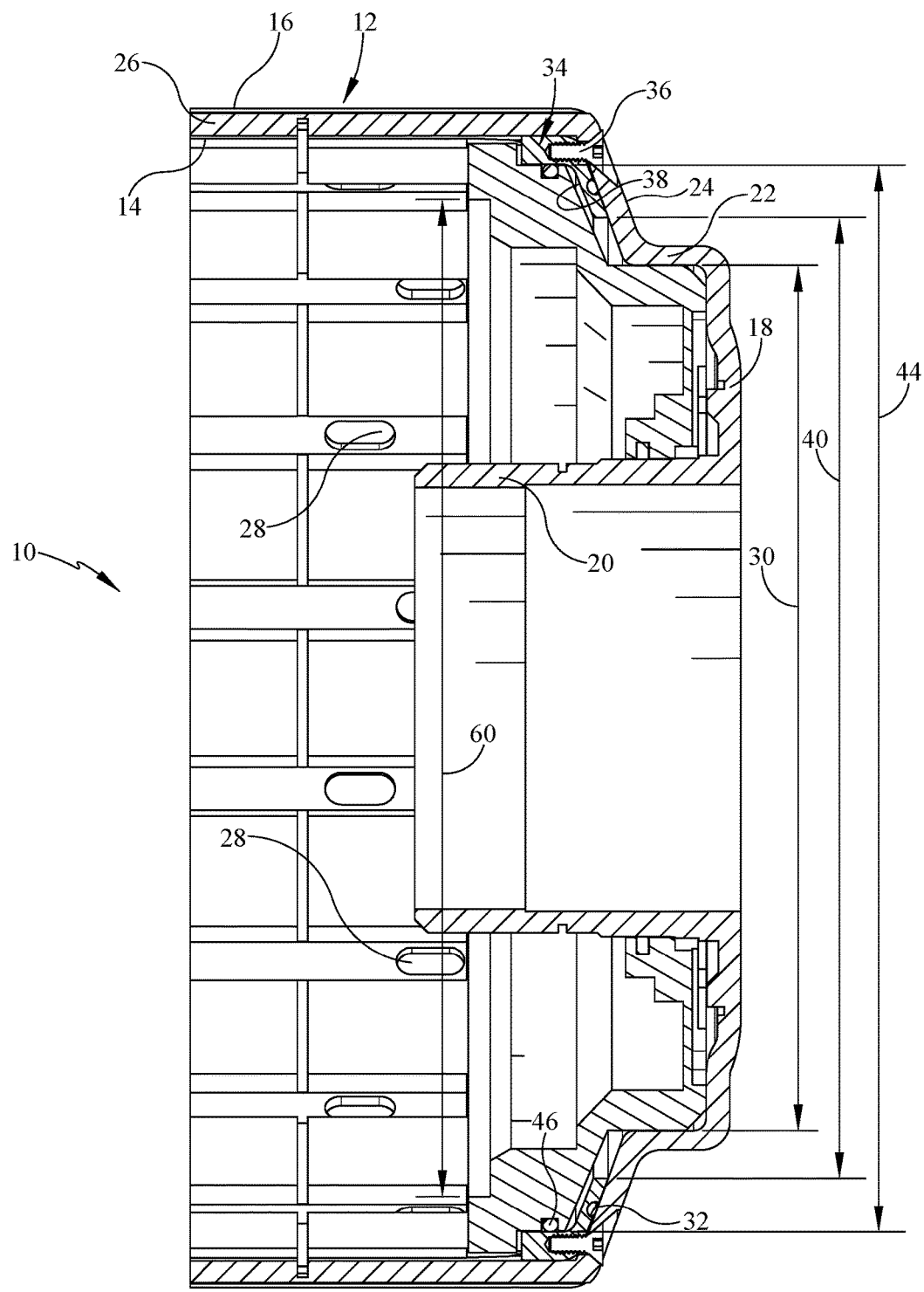
FIG. 5 is a sectioned view of the clutch piston assembly for increasing clamping force taken along line 5-5 in FIG. 4.
Figure 6:
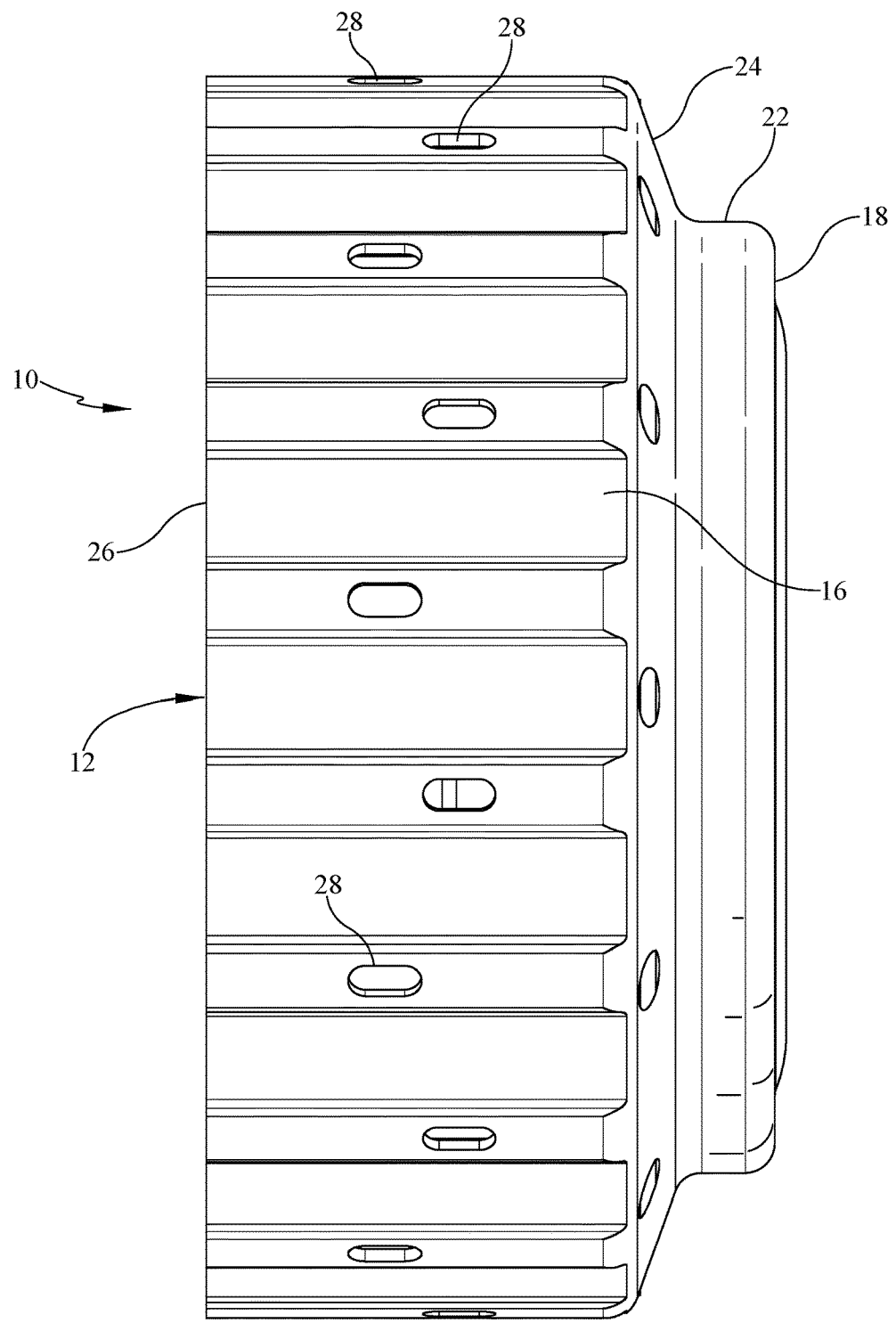
FIG. 6 is a side view of the clutch piston assembly for increasing clamping force. Similar reference numerals refer to similar parts throughout the several views of the drawings.

Referring now to the drawings, it is seen that the clutch piston assembly for increasing clamping force of the present invention, generally denoted by reference numeral 10, is comprised of a piston housing 12. As seen, the piston housing 12 has an interior wall surface 14 and an exterior wall surface 16. The piston housing 12 has a base 18 from which a central housing bore 20 rises upwardly. As seen, the base 18 transitions into an upwardly directed step 22 which transitions into a diagonally upwardly and outwardly directed shoulder 24, which transitions into an upwardly directed side wall 26. The piston housing 12 is formed as a single unitary, indeed monolithic, unit that can be formed from any appropriate material such as aluminum, steel, titanium, etc. A series of oil openings 28 are located along the side wall 26. The upwardly directed step 22 has a first diameter 30.

A first O-ring 32, made of any appropriate sealing material, such as silicone, rubber, neoprene, and the like, is seated within the piston housing 12, sitting on the shoulder 24 proximate its transition from the upwardly directed step 22. A cylinder bore ring 34 is seated within the piston housing 12, sitting atop the first O-ring 32 and the shoulder 24 and abutting the interior wall surface 14 of the side wall 26. A series of screws 36 pass through the piston housing 12 and into the cylinder bore ring 34 in order to hold the cylinder bore ring 34 within the piston housing 12. The cylinder bore ring 34 has an inner groove 38 that has a second inside diameter 40 which is greater than the inside diameter 30 of the upwardly directed step 22, and the cylinder bore ring 34 also has a an outer groove 42 that has a third inside diameter 44 that is greater than the second inside diameter 40 of the inner groove 38. A second O-ring 46, made from the same or similar materials used to form the first O-ring 32, is seated within an inner groove 38 of the cylinder bore ring 34 while a cylinder bore 48 is seated within the piston hosing 12, sitting on the second O-ring 46, the cylindrical bore ring 34, and the base 18, and having its outer periphery 50 abut the interior wall surface 14 at the side wall 26 and at the upwardly directed step 22, and also abutting an outer wall surface 52 of the central housing bore 20 such that a third O-ring 54, made from the same or similar materials used to form the first O-ring 32 and second O-ring 46, is seated within an interior annular groove 56 of the cylinder bore 48 in order to seal the cylinder bore's abutment against the central housing bore 20.

As seen, the cylinder bore 48 has a series of progressively wider (inside diameter measured) inner grooves, with the upmost groove 58 (furthest from the base 18) being the widest and having a fourth inside diameter 60 that is smaller relative to the third inside diameter 44. By having a relatively smaller apply surface of the cylinder bore 48, defined at the fourth inside diameter 60, the overall clutch piston assembly for increasing clamping 10 is able to exert a relatively greater clamping pressure.

The central bore ring 34 and the cylinder bore 48 may be made from the same or similar material used to form the piston housing 12

While the invention has been particularly shown and described with reference to an embodiment thereof, it will be appreciated by those skilled in the art that various changes in form and detail may be made without departing from the spirit and scope of the invention.

We claim:

1. A clutch piston assembly for increasing clamping pressure comprising:
    a piston housing having an interior wall surface and an exterior wall surface, the piston housing also having a base that transitions at a first end into an upwardly directed step, which transitions into a diagonally upwardly and outwardly shoulder, which transitions into an upwardly directed side wall, an opposing end of the base transitioning into a central housing bore, such the upwardly directed step has a first diameter;
    a first O-ring disposed within the piston housing seated on the shoulder proximate the shoulder's transition from the upwardly directed step;
    a cylinder bore ring disposed within the piston housing atop the first O-ring and the shoulder and abutting the interior wall surface of the side wall, the cylinder bore ring having an inner groove that has a second inside diameter which is greater than the first inside diameter, and the central bore also has an outer groove that has a third inside diameter that is greater than the second inside diameter;
    a cylinder bore disposed within the piston housing seated on the cylindrical bore ring and on the base, the cylinder bore having an outer periphery abutting the interior wall surface at the side wall and at the upwardly directed step, the central bore also abutting an outer wall surface of the central housing bore, the cylinder bore having a series of progressively wider inner grooves, with the upmost groove being the widest and having a fourth inside diameter that is smaller relative to the third inside diameter and being the outer limit of the cylinder bore apply area.

2. The clutch piston assembly for increasing clamping pressure as in claim 1 further comprising a second O-ring disposed between the cylinder bore ring and the cylinder bore.

3. The clutch piston assembly for increasing clamping pressure as in claim 2 further comprising a series of screws passing through the piston housing and into the cylinder bore ring.

4. The clutch piston assembly for increasing clamping pressure as in claim 3 wherein the cylinder bore has an interior annular groove that receives a third O-ring, the third O-ring abutting the outer wall surface of the central housing bore.

5. The clutch piston assembly for increasing clamping pressure as in claim 1 further comprising a series of screws passing through the piston housing and into the cylinder bore ring.

6. The clutch piston assembly for increasing clamping pressure as in claim 1 wherein the cylinder bore has an interior annular groove that receives a second O-ring, the second O-ring abutting the outer wall surface of the central housing bore.

* * * * *